United States Patent [19]

Garcia

[11] Patent Number: 4,937,023
[45] Date of Patent: Jun. 26, 1990

[54] METHOD FOR MANUFACTURING MASKS FOR FANCY DRESSES OR THE LIKE

[76] Inventor: Alfredo B. Garcia, Pg. Manuel Girona, 21, 08034, Barcelona, Spain

[21] Appl. No.: 344,298

[22] Filed: Apr. 27, 1989

[51] Int. Cl.$^5$ .................................... C08J 9/28
[52] U.S. Cl. .......................... 264/50; 264/54; 521/65; 521/72; 521/71
[58] Field of Search ............... 264/50, 54; 521/65, 521/71, 72

[56] References Cited

U.S. PATENT DOCUMENTS 4,501,825 2/1985 Magyar ........................... 521/71
4,506,037 3/1985 Suzuki et al. .................... 521/71

*Primary Examiner*—Morton Foelak
*Attorney, Agent, or Firm*—Steinberg & Raskin

[57] ABSTRACT

The method of the kind, comprising: incorporating vulcanizing substances to natural rubber latex, leaving the mixture to react and vulcanize, filling a mask mold with the vulcanized product, pouring the product out of the mold when a product film of the desired thickness has adhered to the surface of the mold, and stripping the film off the mold. According to the invention, the method further comprises: centrifuging the vulcanized latex to remove the chemicals which have not been incorporated during the reaction; performing a foaming by mechanical or chemical means after the maceration step, and performing a drying after pouring the product out the mold, by heating to from 50° to 90° C. to facilitate stripping the mask off the mold.

4 Claims, No Drawings

METHOD FOR MANUFACTURING MASKS FOR FANCY DRESSES OR THE LIKE

The present invention relates to a method for manufacturing masks for fancy dresses and the like, and more specifically to the manufacture of such masks having the feature of allowing perspiration of the body parts upon which they are used.

BACKGROUND OF THE INVENTION

A well known method for the manufacture of masks for fancy dresses and the like consists of incorporating vulcanizing substances to natural rubber latex, leaving the mixture to react such that the vulcanization takes place, filling the mask mold with the thus obtained product, pouring the product out of the mold when a vulcanized rubber latex film of the desired thickness has formed and adhered to the surface of the mask mold, and stripping the thus formed mask film off the mold.

The masks made according to the above described method are adapted to fit on the user's face, though they have two main drawbacks as follows:

In first place, the latex film being impervious, it prevents the perspiration from being vented through it, thus giving to the user a feeling of anguish and suffocation which increases when, as it is assumed, the mask is used in a ballroom the atmosphere of which is very laden, thus giving rise to sweating under the dancing and the like movements.

Secondly, the material of which the obtained masks are made is rather stiff and not very elastic, and therefore the mask does not fit well upon the face and the head of the user and is liable to become of unpleasant and uncomfortable tightness, or even is liable to not remain stable in the desired position, thus making the vision and breathing difficult through the narrow openings provided on the mask to correspond with the user eyes or mouth.

SUMMARY OF THE INVENTION

With the present invention the above drawbacks are solved owing to the fact that the method forming the subject thereof procures a porous mask allowing perspiration through it.

The method for manufacturing masks for fancy dresses and the like is featured in that it comprises:

centrifuging the vulcanized latex to remove the chemicals which have not been incorporated during the reaction;

performing a foaming by mechanical or chemical means after the reaction step; and performing a drying after pouring the product out the mold, by heating to from 50° to 90° C., to facilitate stripping the mask off the mold;

thus obtaining a product mask which is porous and allows perspiration to take place through it.

To advantage, the proportion of vulcanizing agents present in the vulcanization reaction is comprises between 3 and 6%.

Zinc dibenzoyl dithiocarbonate is a vulcanizing agent preferably used.

DESCRIPTION OF A PREFERRED EMBODIMENT

This method according to the invention, above described in diagrammatic form, comprises in fact other steps as can be ascertained hereafter.

The method starts with pure natural rubber latex which is vulcanized using vulcanizing agents deprived of neither allergic nor cancerigenic action on the human skin, such as the above indicated vulcanizing agent, zinc dibenzoyl dithiocarbonate, which is used in a proportion of from 1 to 3%.

Once the vulcanizing agents have been incorporated to the latex composition, the mixture is allowed to react so that the vulcanization takes place, and the product is centrifuged afterwards to remove chemicals which have not been incorporated.

Just before molding the masks, a portion of the vulcanized latex is foamed by chemical or mechanical means.

The thus obtained foam is filled into molds formed with the shape of the masks to be obtained. The molds are poured out quite immediately after its filling such that a vulcanized foamed latex film is formed adhered to the inside of the mold, and this film is thereafter dried by absorption or heating. The dried film can then be stripped off the mold and is thereafter washed at a high temperature, in order to dissolve eventual residues of the vulcanization agents. The film product is finally dried.

Now, the surplus portions of the film are trimmed off, as well as the orifices for the eyes and other necessary parts according to the model of mask to be obtained. Finally the mask is decorated with paints having neither toxicity nor irritating action on the human skin.

It is thus obtained a mask formed of a porous latex film having thousands of pores per $cm^2$ allowing a practically total perspiration on the whole surface of the mask.

Furthermore, the mask absorbs skin sweat, and because it is formed of a film with more that 80% in volume of voids due to the air cells opened during the foaming step, the mask is very elastic and smooth. Due to these properties, the mask can be fit very easily, it compresses no zone of the head, and keeps in the fitted position because it is not slippery.

It appears from the above description that the method according to the invention leads to a mask solving the drawbacks described in the preamble.

I claim:

1. In a method for manufacturing masks for fancy dress and the like, comprising:
   vulcanizing natural rubber latex in order to obtain a vulcanized latex,
   filling a mask mold with the thus-vulcanized latex, which forms a film of desired thickness adhering to a surface of the mold,
   pouring out of the mold, vulcanized rubber latex which has not adhered to the surface of the mold; and
   stripping the thus-formed mask film off the mold;
   the improvement comprising:
   foaming the latex by mechanical or chemical means, after the vulcanizing and before the filling into the mask mold; and
   drying the thus-formed mask film after the pouring out of the non-adhering latex from the mold, by heating to a temperature from 50° to 90° C., to facilitate the stripping of the mask off the mold,
   thus obtaining a mask which is porous and allows perspiration to take place therethrough.

2. The method of claim 1, comprising the additional step of
   centrifuging the thus-vulcanized latex after the vulcanizing and before the foaming, to remove chemicals which have not been incorporated during the vulcanizing.

3. A method for the manufacture of masks, according to claim 1, characterized in that the proportion of vulcanizing agents present in the vulcanization reaction is between 3 and 6%.

4. A method for the manufacture of masks, according to claim 1, characterized in that the vulcanizing agent is zinc dibenzoyl dithiocarbonate.

* * * * *